Patented Aug. 22, 1939

2,170,474

UNITED STATES PATENT OFFICE 2,170,474

BENZIMIDAZOLES AND PROCESS OF MAKING SAME

Charles Graenacher and Jules Meyer, Basel, Switzerland, assignors to the firm of Society of Chemical Industry in Basle, Basel, Switzerland No Drawing. Application March 18, 1937, Serial No. 131,746. In Switzerland March 18, 1936

9 Claims. (Cl. 260—309)

This invention relates to the manufacture of new products by treating with an aldehyde a cyclic amidine of which the $\mu$-carbon atom carries a substituent consisting of a chain of at least two carbon atoms, wherein the $\alpha$-carbon atom is present in the form of a methylene group, this chain being interrupted if desired by an oxygen, a sulfur or a nitrogen atom. The products are useful as such or in the form of their derivatives as valuable auxiliaries for every branch of industry in which wetting, emulsifying, dispersing, purifying, washing, softening, foaming or the like is to be aided.

The products of the invention may be sulfonated or reduced or alkylated or aralkylated (the latter operations being carried either to the formation of tertiary bases or to the formation of quarternary ammonium compounds). These various treatments may be combined with each other, for instance after condensation with the aldehyde the product may be first alkylated and then sulfonated or reduced, or first reduced and then alkylated and finally sulfonated. In this manner according to the particular treatment the final product may belong to the class of anion-active textile assistants, like the soaps or, like the inverted soaps to the class of cation-active auxiliaries.

The products thus obtained, insofar as they are derived from benzimidazoles—the process can of course also be applied to naphthimidazoles or perimidines, such as

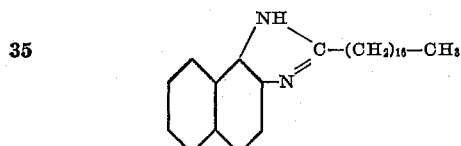

or

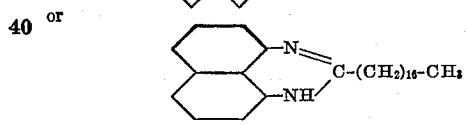

are new benzimidazoles which are characterized by representing $\mu$-substituted benzimidazoles whose $\mu$-substituent is branched at the $\alpha$-carbon atom. Among these new benzimidazoles those are of particular interest in which one of the two branches consists of a straight chain which contains at least 10 and not more than 20 carbon atoms. Among such products those are again particularly valuable which, due to the presence of a sulfo group in the benzene nucleus, or due to the presence of two tertiary or one quaternary nitrogen atom in the imidazole ring, are soluble in water and represent valuable textile assistants. Such products are for example the products of the general formula

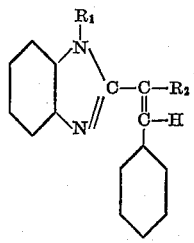

or of the general formula

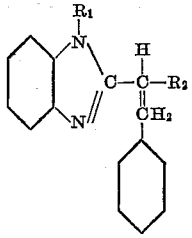

which contain at least in one of the two benzene radicals at least one sulfo group, and in which $R_1$ is a member of the group consisting of hydrogen, alkyl and aralkyl radicals, and $R_2$ consists of a straight chain which contains at least 10 and not more than 20 carbon atoms, which products are light colored powders dissolving in water in the form of their alkali salts to form liquids having marked capillary-active properties, or also the products of the general formula

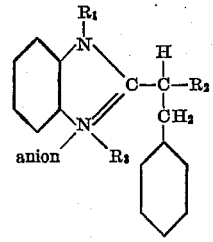

in which $R_1$ and $R_3$ stand for members of the group consisting of alkyl and aralkyl radicals, and $R_2$ consists of a straight chain which contains at least 10 and not more than 20 carbon atoms, which products are light colored powders dissolving in acidified water to form acid solutions having marked capillary-active properties.

The aldehydes used in the condensation may be aromatic or aliphatic. Suitable aldehydes are benzaldehyde, chloro- or nitro-benzaldehydes, dialkylamino-benzaldehydes, anisic aldehyde, cinnamic aldehyde, phenylacetaldehyde, heterocyclic aldehydes such as furfurol or aliphatic aldehydes, for instance formaldehyde, acetaldehyde, valeryl aldehyde, oenanthol, lauric aldehyde or the like.

The condensation is by means of heat, preferably in presence of a condensing agent, for instance boric acid, and if desired in the presence of a suitable diluent. The best sulfonating agents are sulfuric acid, fuming sulfuric acid and chlorosulfonic acid. The sulfonation may be conducted in the presence of a suitable diluent. In the sulfonation the sulfonic acid group enters into the benzene nucleus of the benzimidazole. If the α-carbon of the μ-substituent is replaced by a radical which contains a benzene nucleus, there are obtained sulfonation products in which at least one of the two benzene radicals contains at least one sulfo group. In the treatment with reducing agent the double linkage produced by the condensation is principally reduced. In case other reducable groups are present in the molecule (which occurs, for example, when one starts from nuclear nitrated benzimidazoles or from nitrated aldehydes) there is also reduction, for example to the amino-groups. As alkylating agent or aralkylating agent may be used any of the agents described in the pertinent literature, for example alkyl halide or aralkyl halide, such as methyl and ethyl chlorides or bromides, ethyl iodide, benzyl chloride, alkyl sulfates. In the production of quarternary compounds several such agents may be used, of course, in succession. The formation of the quarternary compounds may also be secured in known manner by heating the aldehyde condensation product with alcohol and an alkyl halide.

The following examples illustrate the invention, the parts being by weight:

*Example 1*

A mixture of 1068 parts of μ-heptadecyl-benzimidazole, 480 parts of benzaldehyde and 10 parts of boric acid is heated at 200–210° C. in an atmosphere of carbon dioxide while stirring. A quarter of an hour after the said temperature has been attained there are added in the course of ¾ hour 50 parts of boric acid in small portions. The water produced is evaporated with the aid of a condenser kept hot with steam and of a slow stream of carbon dioxide passing through the apparatus. After heating for 24 hours at 200–210° C. the reaction is complete. If desired the excess of benzaldehyde is now blown off with steam; the product of reaction of the formula

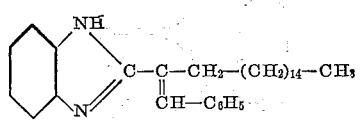

is separated from the water and dried in a vacuum on the water bath. It is liquid at 100° C., but solidifies after some time at room temperature to a soft crystalline mass.

For purification a concentrated alcoholic solution of the crude benzal-μ-heptadecyl-benzimidazole is mixed with a little concentrated hydrochloric acid whereby the hydrochloride of the compound is precipitated in the form of a white crystalline mass.

In like manner anisic aldehyde may be condensed with μ-heptadecyl-benzimidazole. Similar products are obtained when μ-heptadecenyl-benzimidazole or undecyl-benzimidazole or pentadecyl-benzimidazole or tridecylbenzimidazole or the like is substituted for the μ-heptadecyl-benzimidazole. The lauryl ester of the μ-benzimidazole propionic acid of the formula

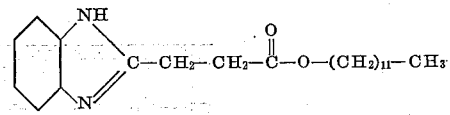

or the benzimidazoles from ortho-phenylenediamine and phenylacetic acid or hydrocinnamic acid or hardened fish oil behave in a similar manner.

*Example 2*

A mixture of 44 parts of μ-ethyl-benzimidazole (melting point 170–172° C.), 48 parts of benzaldehyde (1½ mol) and 1.25 parts of boric acid is heated in an atmosphere of carbon dioxide and with preliminary stirring at 200–210° C. After ¼ hour 1.25 parts of boric acid are added. After 24 hours the product is worked up by first comminuting it; it is then treated with steam to expel the excess of benzaldehyde whereupon the residue is filtered and dried. After twice recrystallizing to an absolute alcohol there is obtained the benzal-μ-ethyl-benzimidazole of the formula

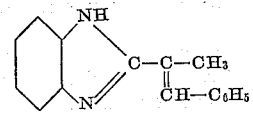

in the form of colorless leaflets which are insoluble in water and melt at 245° C.

*Example 3*

35.6 parts of μ-heptadecyl-benzimidazole, 21 parts of cinnamic aldehyde and 2 parts of boric acid are together heated for 6 hours at 220° C. in an atmosphere of carbon dioxide or other inert gas while stirring. For working up the product the excess of cinnamic aldehyde is expelled with steam, the residue is separated from water and dried in a vacuum. The product is a soft transparent mass which yields a crystallized hydrochloride when precipitated from alcoholic solution by means of hydrochloric acid. It corresponds to the formula

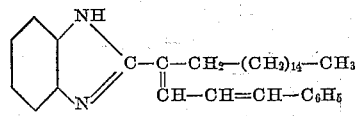

In like manner the nitro- or the dialkylamino-benzaldehyde may be treated, also furfurol.

*Example 4*

35.6 parts of μ-heptadecyl-benzimidazole and 4.5 parts of para-formaldehyde are heated together for 24 hours in an autoclave at 180–225° C. The product no longer smells of formaldehyde even when treated with steam.

The product which corresponds probably to the formula

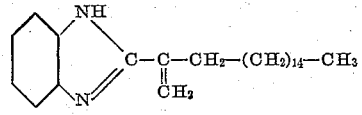

is a crystalline mass which is insoluble in water.

Example 5

In a vessel provided with a stirrer 50 parts of fused benzal-μ-heptadecyl-benzimidazole are gradually run into 100 parts of sulfuric acid monohydrate maintained at a temperature of 10–15° C., care being taken by external cooling that the temperature of the mixture does not rise above 15° C. When all has been run in and the whole is dissolved homogeneously in the sulfuric acid there are gradually run in 90–100 parts of fuming sulfuric acid (24 per cent. $SO_3$), the sulfonating temperature being maintained at 12–15° C.

The sulfonation is complete when a sample of the mass dissolves clearly in water. The mass is poured on to 600 parts of ice, whereby the sulfonic acid separates and may be removed from the aqueous sulfuric acid. After neutralization of the sulfonic acid with dilute sodium hydroxide solution and evaporating the sodium salt of the sulfonic acid is obtained in the form of a light colored powder which dissolves freely in water to a solution which has pronounced washing, dispersing and protective colloid properties.

Like products may be obtained by sulfonating the benzal or anisal condensation products of the last paragraph of Example 1.

Example 6

44 parts of benzal-μ-heptadecyl-benzimidazole and 15–20 parts of benzyl chloride are heated together for 20 hours at 160–165° C. The excess of benzyl chloride is expelled by steam, the reaction product is separated from the water and dried in a vacuum on the water bath. At room temperature the crude product thus obtained solidifies after some time to a semi-solid crystalline mass. This product which corresponds probably to the formula

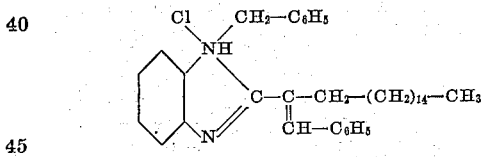

is insoluble in ether but soluble in symmetrical dichlorethane from which the hydrochloride of N-benzyl-benzal-μ-heptadecyl-benzimidazole may be crystallized in colorless needles insoluble in water.

In like manner the other product obtainable as described in Examples 1, 2 and 3 may be benzylated.

Example 7

In a vessel having a stirrer 25 parts of the benzylated benzal-μ-heptadecyl-benzimidazole hydrochloride obtainable as described in Example 6 are added gradually in small portions to 50 parts of sulfuric acid monohydrate, the temperature of the mixture being kept constant at 10–15° C. When all has dissolved there are run in gradually at the same temperature 35–40 parts of fuming sulfuric acid (24 per cent. $SO_3$). The sulfonation is complete when a sample of the mixture dissolves clearly in water. After pouring the mass on to 300 parts of ice the precipitated sulfonic acid is removed from the aqueous sulfuric acid and is neutralized with dilute sodium hydroxide solution; by evaporation the sodium salt of the sulfonated N-benzyl-benzal-μ-heptadecyl-benzimidazole is obtained in the form of a light colored powder which dissolves in water to a solution having pronounced washing and dispersing properties.

In like manner the other benzylated products obtainable as described in Example 6 may be sulfonated.

Example 8

A mixture of 44 parts of benzal-μ-heptadecyl-benzimidazole and 10–13 parts of ethyl chloride is heated in a pressure vessel for 17 hours at 150–155° C. The excess of ethyl chloride is then removed by heating the product in a vacuum.

The N-ethyl-benzal-μ-heptadecyl-benzimidazole hydrochloride of the formula

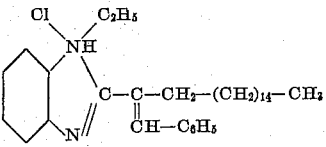

thus produced solidifies gradually to a crystalline soft mass. It is insoluble in ether, soluble in symmetrical dichlorethane. The hydrochloride is only very sparingly soluble in hot water and may be obtained by recrystallization from alcohol in the form of a fine white crystalline mass. The condensation products obtainable as described in Examples 1, 2 and 3 may be converted into ethylated derivatives in similar manner. Like products are obtained also when instead of ethylating one methylates or propylates.

By sulfonating such products as described in Examples 7 easily soluble sulfonic acids are obtained the alkali salts of which have pronounced capillary active properties.

Example 9

A mixture of 18 parts of benzal-μ-heptadecyl-benzimidazole, 5.2 parts of methyl alcohol and 15.6 parts of ethyl chloride is heated for 17 hours at 160–165° C. in a pressure vessel. The excess of methyl alcohol and the ethyl chloride is then expelled whereby the reaction product is obtained in the form of a pasty mass clearly soluble in water.

The new product which corresponds probably to the formula

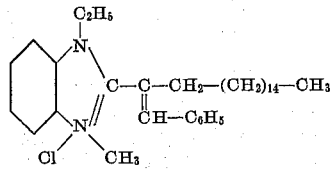

has the properties of the quaternary ammonium compounds; its aqueous solution has strong capillary active properties. The aqueous solution of the product also has the property of precipitating from the solution dyestuffs containing sulfo-groups.

In like manner the other products obtainable as described in Examples 1, 2 and 3 may be converted into ammonium compounds.

Example 10

50 parts of benzal-μ-heptadecyl-benzimidazole are dissolved in 200 parts of alcohol and the solution is shaken with 5 parts of nickel catalyst at 85° C. and under a hydrogen pressure amounting to 20 atmospheres for 3 hours. In this manner 1 mol. of hydrogen is taken up by the compound.

After filtering from the nickel catalyst and evaporating the filtrate to dryness there is obtained a resinous mass which can be drawn into threads; after some time this product solidifies to a crystalline mass.

If an alcoholic solution of the product is mixed with concentrated hydrochloric acid a well crystallized hydrochloride which corresponds probably to the formula

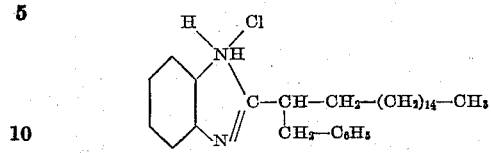

is precipitated.

In like manner the other compounds obtainable as described in Examples 1, 2, 3 and 4 may be hydrogenated.

*Example 11*

25 parts of the α-benzyl-μ-heptadecyl-benzimidazole made as described in Example 10 are dissolved at about 15° C. in 50 parts of sulfuric acid of 100 per cent. strength and the solution is mixed at 10° C. with 45 parts of fuming sulfuric acid of 24 per cent. strength. After about 45 minutes the mixture becomes clearly soluble in water. It is now poured upon 300 parts of ice whereupon the di-sulfonic acid collects into clumps, the aqueous acid is withdrawn and the solid matter is dissolved in about 500 parts of water and the solution is neutralized with concentrated sodium hydroxide solution. On evaporation in a vacuum the solution yields the di-sodium salt which is a particularly good washing agent.

*Example 12*

Raw wool is washed at 45° C. in a liquor which contains per liter 1 gram of the product obtainable as described in paragraph 2 of Example 5. The washed wool is white. The effect of the washing is not annulled by hard water.

*Example 13*

100 parts of cotton yarn are dyed with 2.5 per cent. of Direct Sky Blue greenish (Colour Index No. 518), 30 per cent. of crystallized Glaubers salt and 2 per cent. of sodium carbonate in a liquor ratio of 1:20 for 1 hour at a temperature near the boiling point. The goods are then rinsed and after-treated for 20 minutes in a cold bath containing per liter 1 gram of the product of Example 9. A water test shows that the dyeing of the yarn after-treated in this manner is considerably faster to water than that of the yarn which is not after-treated.

What we claim is:

1. The μ-substituted benzimidazoles of which the μ-substituent is branched at the α-carbon atom, and in which one of the two branches consists of a straight chain which contains at least 10 and not more than 20 carbon atoms and at the most one double bond.

2. The μ-substituted benzimidazoles of which the μ-substituent is branched at the α-carbon atom, and in which one of the two branches consists of a straight chain which contains at least 10 and not more than 20 carbon atoms and at the most one double bond, and the other branch contains an aromatic nucleus of the benzene series.

3. The μ-substituted benzimidazoles of which the μ-substituent is branched at the α-carbon atom, and in which one of the two branches consists of a straight chain which contains at least 10 and not more than 20 carbon atoms and at the most one double bond, and the other branch consists of a benzene nucleus and a further carbon atom in which the carbon atom brings about the linkage between the α-carbon atom of the μ-substituent and the benzene nucleus of the branch.

4. The benzimidazoles of the general formula

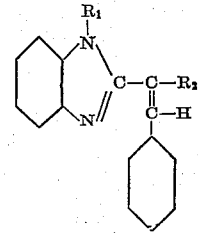

which contain at least in one of the two benzene radicals at least one sulfo group, and in which $R_1$ is a member of the group consisting of hydrogen, methyl, ethyl and benzyl radicals, and $R_2$ consists of a straight chain which contains at least 10 and not more than 20 carbon atoms and at the most one double bond, which products are light colored powders dissolving in water in the form of their alkali salts to form liquids having marked capillary-active properties.

5. The benzimidazoles of the general formula

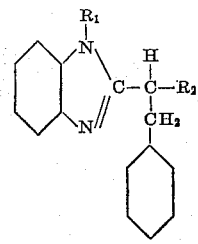

which contain at least in one of the two benzene radicals at least one sulfo group, and in which $R_1$ is a member of the group consisting of hydrogen, methyl, ethyl and benzyl radicals, and $R_2$ consists of a straight chain which contains at least 10 and not more than 20 carbon atoms and at the most one double bond, which products are light colored powders dissolving in water in the form of their alkali salts to form liquids having marked capillary-active properties.

6. The benzimidazoles of the general formula

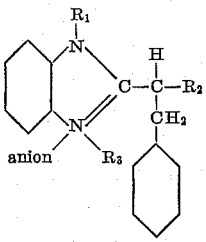

in which $R_1$ and $R_3$ are members of the group consisting of methyl, ethyl and benzyl radicals, and $R_2$ consists of a straight chain which contains at least 10 and not more than 20 carbon atoms and at the most one double bond, which products are light colored powders dissolving in acidified water to form acid solutions having marked capillary-active properties.

7. The benzimidazoles of the formula

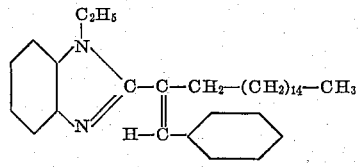

which contain at least in one of the two benzene radicals at least one sulfo group, which products are light colored powders dissolving in acidified water to form acid solutions having marked capillary-active properties.

8. The benzimidazoles of the general formula

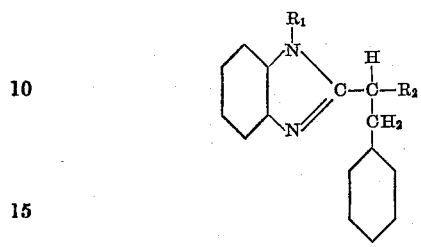

which contain at least in one of the two benzene radicals at least one sulfo group, and in which $R_1$ stands for an ethyl group, and $R_2$ consists of a straight chain which contains at least 10 and not more than 20 carbon atoms and at the most one double bond, which products are light colored powders dissolving in water in the form of their alkali salts to form liquids having marked capillary-active properties.

9. The benzimidazole of the formula

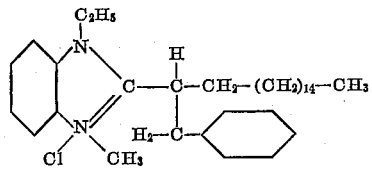

which product is a light colored powder dissolving in acidified water to form an acid solution having marked capillary-active properties.

CHARLES GRAENACHER.
JULES MEYER.